(12) United States Patent
Kim et al.

(10) Patent No.: US 12,543,485 B2
(45) Date of Patent: Feb. 3, 2026

(54) LIGHT EMITTING DISPLAY DEVICE

(71) Applicant: LG DISPLAY CO., LTD., Seoul (KR)

(72) Inventors: Seong Kwang Kim, Seoul (KR); Ki Hyung Lee, Seoul (KR); Kang Il Kim, Seoul (KR); Seong Ku Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 298 days.

(21) Appl. No.: 18/222,245

(22) Filed: Jul. 14, 2023

(65) Prior Publication Data
US 2024/0260426 A1  Aug. 1, 2024

(30) Foreign Application Priority Data

Jan. 30, 2023  (KR) .................. 10-2023-0011877

(51) Int. Cl.
| | |
|---|---|
| *H10K 59/80* | (2023.01) |
| *G06F 3/041* | (2006.01) |
| *G06F 3/044* | (2006.01) |
| *H10K 59/38* | (2023.01) |
| *H10K 59/40* | (2023.01) |

(52) U.S. Cl.
CPC ....... *H10K 59/8792* (2023.02); *G06F 3/0412* (2013.01); *G06F 3/04164* (2019.05); *G06F 3/0445* (2019.05); *G06F 3/0446* (2019.05); *H10K 59/38* (2023.02); *H10K 59/40* (2023.02)

(58) Field of Classification Search
CPC ... H10K 50/865; H10K 59/8792; H10K 59/38
See application file for complete search history.

(56) References Cited

U.S. PATENT DOCUMENTS

| | | | |
|---|---|---|---|
| 2004/0185604 A1* | 9/2004 | Park | H10K 50/814 438/149 |
| 2007/0123135 A1* | 5/2007 | Yang | H10K 59/38 445/24 |
| 2010/0097295 A1* | 4/2010 | Kwak | H10K 50/828 345/32 |
| 2010/0102713 A1* | 4/2010 | Seo | H10K 50/824 313/504 |
| 2015/0270319 A1* | 9/2015 | Ishii | H10K 59/38 257/40 |

FOREIGN PATENT DOCUMENTS

| | | |
|---|---|---|
| KR | 10-2010-0057636 A | 5/2010 |
| KR | 10-2015-0003009 A | 1/2015 |
| KR | 10-2015-0033406 A | 4/2015 |

* cited by examiner

*Primary Examiner* — Evren Seven
(74) *Attorney, Agent, or Firm* — PnK IP LLC

(57) ABSTRACT

A light emitting display device includes color conversion units on a first substrate, each of the color conversion units having an overlapping area and a non-overlapping area, a black matrix on the overlapping area of each of the color conversion units, and an auxiliary electrode pattern between the black matrix and each of the color conversion units, the auxiliary electrode pattern farther inwards than the black matrix.

23 Claims, 15 Drawing Sheets

LIGHT EMITTING DISPLAY DEVICE

CROSS-REFERENCE TO RELATED APPLICATION

This application claims the priority of Korean Patent Application No. 10-2023-0011877, filed on Jan. 30, 2023, which is hereby incorporated by reference in its entirety.

BACKGROUND

Field of the Disclosure

The present disclosure relates to a light emitting display device, and more particularly, to a light emitting display device for improving color viewing angle properties and removing residues of a black matrix.

Description of the Background

Image display devices, which implement various information on a screen, are key technologies in the information and communication era, and various display devices having excellent performance, such as slimness, light weight and low power consumption, are being developed.

A light emitting display device among the image display devices has color conversion units on a first substrate opposite to a second substrate having light emitting devices formed thereon, thereby being capable of realizing full color in the light emitting devices.

Here, the first substrate may include the plurality of color conversion units and a matrix disposed between the plurality of color conversion units. Here, when the black matrix is provided between the color conversion units and the first substrate, a distance between the black matrix and emission areas may be too long.

As a result, a color is not displayed through the color conversion unit corresponding to one emission area but is displayed through an adjacent another color conversion unit depending on observer's viewing positions, and a problem in color viewing angle properties in which color change occurs may arise.

SUMMARY

Accordingly, the present disclosure is directed to a light emitting display device that substantially obviates one or more problems due to limitations and disadvantages of the related art.

More specifically, the present disclosure is to provide a light emitting display device which has a black matrix on overlapping areas of a plurality of color conversion units to improve color viewing angle properties.

The present disclosure is also to provide a light emitting display device which has an auxiliary electrode pattern between color conversion units and a black matrix to remove residues of the black matrix from non-overlapping areas of the color conversion units.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the present disclosure, as embodied and broadly described herein, a light emitting display device includes color conversion units on a first substrate, each of the color conversion units having an overlapping area and a non-overlapping area, a black matrix on the overlapping area of each of the color conversion units, and an auxiliary electrode pattern between the black matrix and each of the color conversion units, the auxiliary electrode pattern farther inwards than the black matrix.

In another aspect of the present disclosure, a light emitting display device includes a first substrate; a plurality of color conversion units provided on the first substrate, each color conversion unit having an overlapping area and a non-overlapping area; a black matrix provided in the overlapping area of the plurality of color conversion units; a first touch electrode provided between the black matrix and the plurality of color conversion units, and provided farther inward than the black matrix; and a second touch electrode overlapping with the first touch electrodes.

In yet another aspect of the present disclosure, a method of manufacturing a light emitting display device includes forming a plurality of color conversion units on a first substrate, each color conversion unit having an overlapping area and a non-overlapping area; forming an auxiliary electrode material disposed on the plurality of color conversion units; forming a black matrix disposed on the overlapping area of each of the color conversion units; and forming an auxiliary electrode pattern having a second width narrower than a first width of the black matrix, by etching the auxiliary electrode material using the black matrix as a mask.

In a further aspect of the present disclosure, a light emitting display device includes first and second conversion units disposed on a first substrate and each conversion unit including an overlapping area and a non-overlapping area; a first electrode disposed on the overlapping area of the first convention unit and the non-overlapping areas of each conversion unit; a black matrix disposed on the first electrode, wherein the black matrix has an edge extends more than an edge of the first electrode toward the non-overlapping area of at least one of the first and second conversion units.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate various aspects and together with the description serve to explain the principle of the disclosure.

In the drawings.

DETAILED DESCRIPTION

Figure 1:
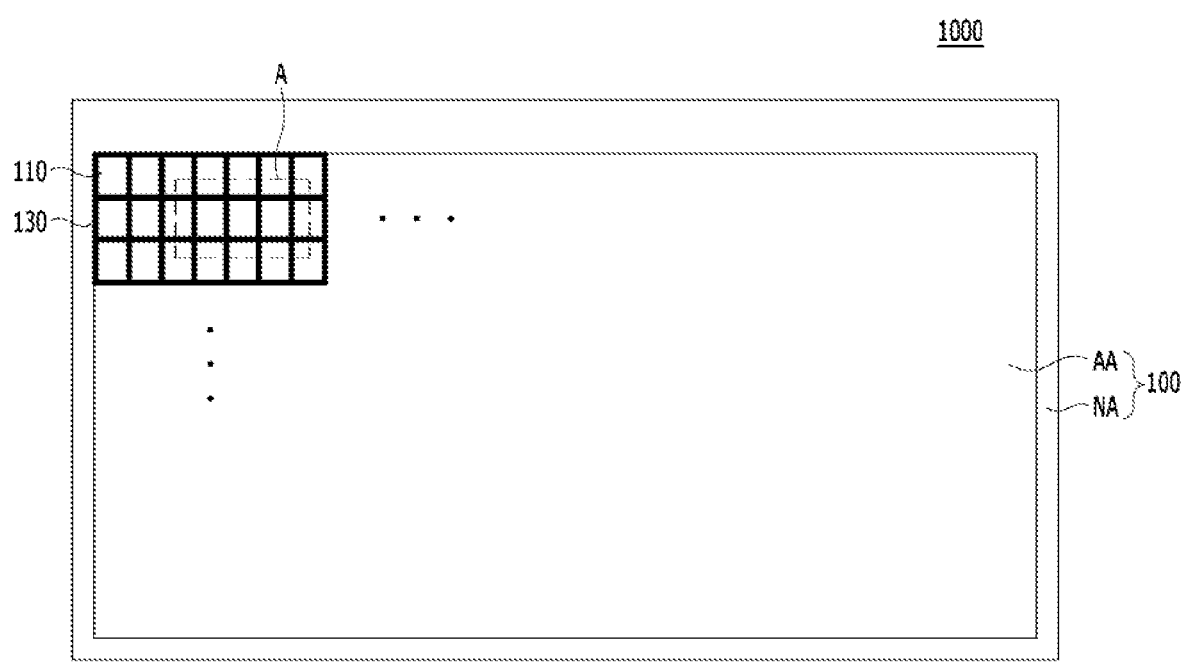
FIG. 1 is a plan view of a light emitting display device according to a first aspect of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

The shapes, sizes, ratios, angles, numbers, and the like disclosed in the drawings for describing aspects of the present disclosure are merely examples, and thus, the present disclosure is not limited to the illustrated details. Like reference numerals refer to like elements throughout. In the following description, when the detailed description of the relevant known function or configuration is determined to unnecessarily obscure aspects of the present disclosure, the detailed description will be omitted.

When "comprise," "have," and "include" described in the present disclosure are used, another part may be added unless "only" is used. The terms of a singular form may include plural forms unless referred to the contrary.

In construing an element, the element is construed as including an error or tolerance range although there is no explicit description of such an error or tolerance range.

In describing a positional relationship, for example, when a positional relation between two parts is described as, for example, "on," "over," "under," and "next," one or more other parts may be disposed between the two parts unless a more limiting term, such as "just" or "direct(ly)" is used.

In describing a temporal relationship, for example, when the temporal order is described as, for example, "after," "subsequent," "next," and "before," a situation that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another, and may not define order. For example, a first element could be termed a second element within the scope of the present disclosure.

In the following description of the aspects, terms "first horizontal axis direction," "second horizontal axis direction" and "vertical axis direction" should not be interpreted as having only geometrical relations in which parts are perpendicular to each other, and may mean wider orientations within the ranges in which elements of the disclosure functionally work.

The term "at least one" should be understood as including all combinations presented by one or more of associated elements. For example, "at least one of a first element, a second element or a third element" may not only mean the first element, the second element or the third element, respectively, but also mean all combinations presented by two or more of the first element, the second element and the third element.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in a co-dependent manner.

In the drawings, wherever possible, the same elements will be denoted by the same reference numerals throughout the drawings even though they are depicted in different drawings. Further, the elements illustrated in the accompanying drawings may have scales different from the actual scales thereof for convenience of explanation, and are thus limited by the scales illustrated in the drawings.

Hereinafter, light emitting display devices according to aspects of the present disclosure will be described in detail with reference to accompanying drawings.

Figure 2:
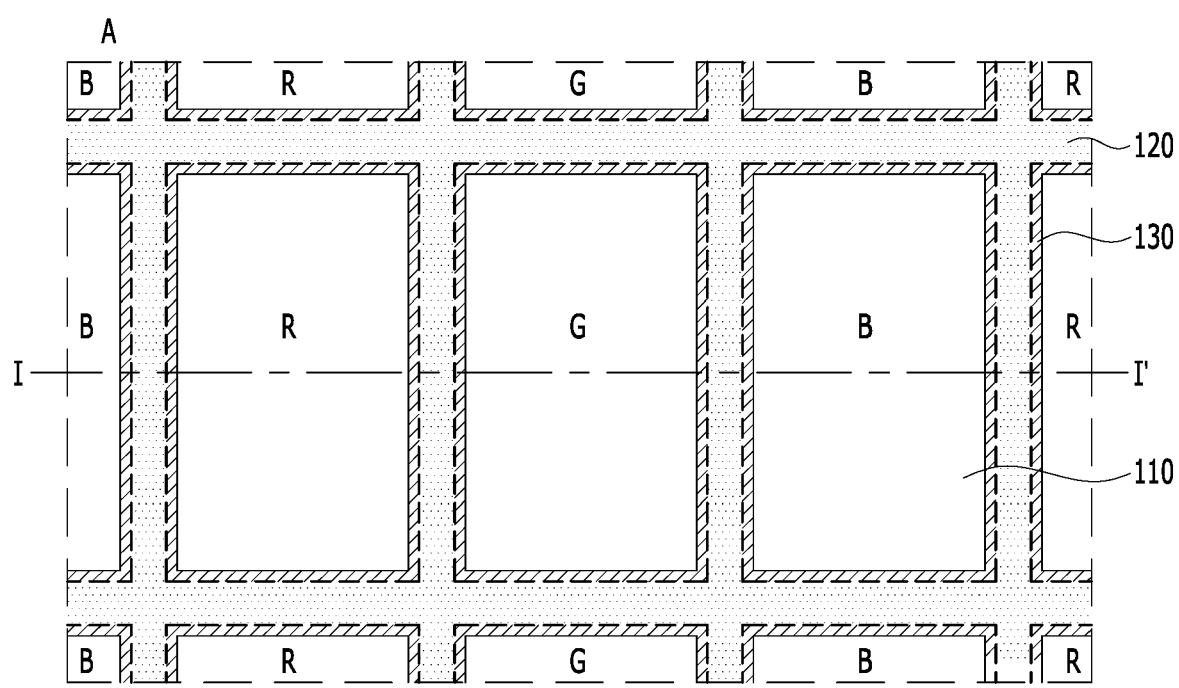
FIG. 2 is an enlarged view of region A of FIG. 1.
Figure 3:
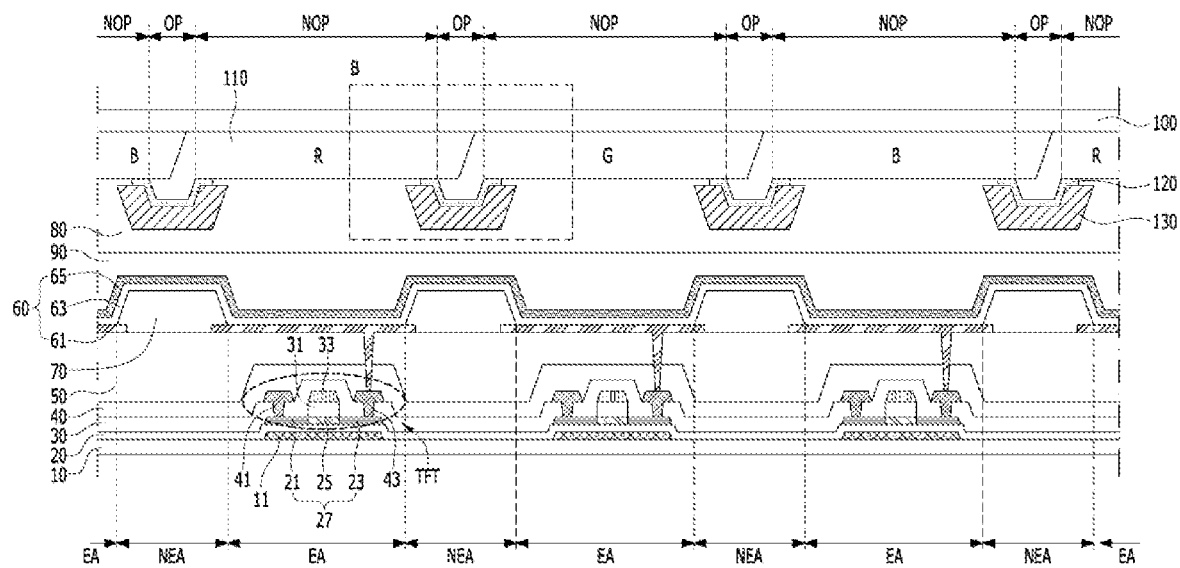
FIG. 3 is a cross-sectional view taken along line I-I' of FIG. 2.

FIG. 1 is a plan view of a light emitting display device according to a first aspect of the present disclosure, FIG. 2 is an enlarged view of region A of FIG. 1, and FIG. 3 is a cross-sectional view taken along line I-I' of FIG. 2.

Collectively referring to FIGS. 1 to 3, the light emitting display device 1000 according to the first aspect of the present disclosure may include a first substrate 100, a plurality of color conversion units 110 provided on the first substrate 100 and alternately having overlapping areas OP and non-overlapping areas NOP, a black matrix 130 provided on the overlapping areas OP of the color conversion units 110, and an auxiliary electrode pattern 120 provided between the black matrix 130 and the color conversion units 110 and located farther inwards than the black matrix 130.

The plurality of color conversion units 110 may be provided throughout an active area AA (shown in FIG. 1) of the first substrate 100. Each of the plurality of color conversion units 110 may be provided to correspond to each of the plurality of emission areas EA (shown in FIG. 3) on the second substrate 10. Further, the plurality of color conversion units 110 may be different color conversion units, i.e., red, green and blue conversion units. Here, the first substrate 100 may be a glass substrate, or the first substrate 100 is a plastic substrate that may include polyimide or polyamide.

Each of the plurality of color conversion units 110 may include the overlapping area OP provided in a region adjacent to other color conversion units 110 to overlap with adjacent color conversion units 110, and the non-overlapping area NOP configured not to overlap with the adjacent color conversion units 110. When the adjacent color conversion units 110 overlap with each other, the edge of one color conversion unit 110 may cover the upper surface of the edge of an adjacent color conversion unit 110, thereby forming the overlapping areas OP of the color conversion units 110.

Figure 4:
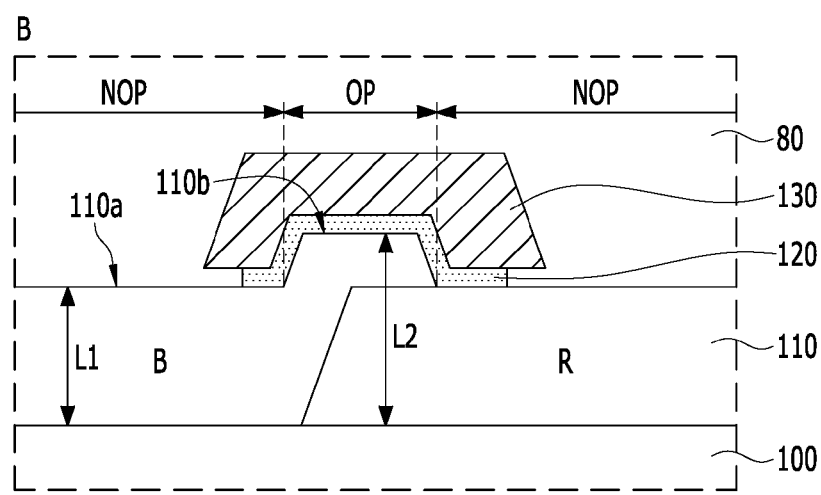
FIG. 4 is an enlarged view of region B of FIG. 3.

Referring to FIG. 4 which is an enlarged view of region B of FIG. 3, a surface 110b of the color overlapping area OP of the color conversion unit 110 may protrude more than a surface 110a of the non-overlapping area NOP in the direction of the second substrate 10. Concretely, the surface 110a of the non-overlapping area NOP of the color conversion unit 110 has a first distance L1 from the first substrate 100, and the surface 110b of the overlapping area OP of the color conversion unit 110 has a second distance L2 from the first substrate 100. That is, the surface 110b of the overlapping area OP of the color conversion unit 110 may be closer to the second substrate 10 facing the first substrate 100 than the surface 110a of the non-overlapping area NOP of the color conversion unit 110.

Here, each color conversion unit 110 may include a pigment of at least one of red, green or blue, and may include an organic material that may include a photosensitive resin. Otherwise, in some cases, each color conversion unit 110 may include an organic material that may a binder resin.

The auxiliary electrode pattern 120 and the black matrix 130 may be sequentially provided on the overlapping areas OP of the color conversion units 110. Concretely, the auxiliary electrode pattern 120 and the black matrix 130 may be provided throughout the first substrate 100 along the non-overlapping area NOP provided in the edges of the color conversion units 110, and may be disposed on the surfaces 110b of the protruding overlapping areas OP of the color conversion units 110.

That is, the black matrix 130 may be provided on the surfaces of the color conversion units 110 facing the second substrate 10. Compared to a general black matrix provided between a first substrate and color conversion units, the black matrix 130 provided on the surfaces of the color conversion units 110 facing the second substrate 10 according to the present disclosure may be provided closer to the emission areas EA on the second substrate 10. Further, the overlapping areas OP of the color conversion units 110 according to the present disclosure may be configured such that the surfaces of the overlapping areas OP protrude more than the surfaces of the non-overlapping areas NOP, and the black matrix 130 provided on the overlapping areas OP of the color conversion units 110 may be closer to the emission areas EA on the second substrate 10 than in the case in which the color conversion units 110 do not overlap with each other.

The black matrix 130 may be formed of an organic material such as a black resin. Therefore, the black matrix 130 provided between different color conversion units 110 may prevent mixing of colored lights from the different color conversion units 110, when light emitting devices 60 emit light.

Further, the light emitting display device according to the present disclosure may improve color viewing angle properties in which a color is not displayed through a color conversion unit corresponding to one emission area, and is displayed through an adjacent different color conversion unit depending on observer position changes, and thus color change occurs. That is, in the light emitting display device according to the present disclosure, the black matrix 130 may be disposed close to the emission areas EA which emit light, so that a route through which light from one emission area EA travels towards other color conversion units 110 not corresponding to the emission area EA may be blocked, and thereby, color change may not occur even when the position of an observer is changed.

The auxiliary electrode pattern 120 may be provided between the color conversion units 110 and the black matrix 130. the side surface of The auxiliary electrode pattern 120 may be provided farther inward than the side surface of the black matrix 130. That is, the auxiliary electrode pattern 120 may be provided with a narrower width than the black matrix 130. The auxiliary electrode pattern 120 according to the first aspect may have a function of removing residues (130a shown in FIG. 5C) of the black matrix 130 which may occur during a process of forming the black matrix 130.

In the case that the auxiliary electrode pattern 120 is not provided, when a black matrix material is deposited on the entirety of the color conversion units 110 and is etched, the black matrix material in unset areas is not etched and thus a large amount of residues of the black matrix 130 may occur. The reason is the black matrix 130 may be formed of a similar organic material to the color conversion units 110. However, in the present disclosure, the auxiliary electrode pattern 120 is provided between the color conversion units 110 and the black matrix 130, and thus, the residues 130a of the black matrix 130 may be removed together with an auxiliary electrode pattern material 120a (shown in FIG. 5B). Therefore, the light emitting display device according to the present disclosure may increase light transmittance and color transmittance, because no residues of the black matrix 130 remain on the non-overlapping areas NOP of the color conversion units 110 corresponding to the emission areas EA.

To exhibit the function of removing the residues of the black matrix 130, the auxiliary electrode pattern 120 may have the following characteristics.

The auxiliary electrode pattern 120 may be formed of a material which is not crystallized during the process of forming the black matrix 130. Concretely, in the light emitting display device according to the present disclosure, because the auxiliary electrode pattern 120 is formed after the process of forming the black matrix 130 has been completed before etching the auxiliary electrode pattern material 120a, the auxiliary electrode pattern 120 may be formed of a material which is not crystallized during a process of curing the black matrix 130.

Further, the auxiliary electrode pattern 120 may be formed of a material having a high etch rate. Concretely, the auxiliary electrode pattern 120 may be formed to have at least the width of the black matrix 130 to remove all the residues of the black matrix 130 occurred on the areas of the color conversion units 110 which do not overlap with the black matrix 130. For this purpose, the auxiliary electrode pattern 120 should be formed of a material having a high etch rate to be formed farther inward than the black matrix 130.

For example, the auxiliary electrode pattern 120 may be formed as a single layer or multiple layers formed of one of a transparent indium oxide, such as indium zinc oxide (IZO), indium gallium zinc oxide, or indium tin oxide, molybdenum (Mo), aluminum (Al), chrome (Cr), gold (Au), titanium (Ti), nickel (Ni), neodymium (Nd), copper (Cu), and alloys thereof, as a material which is not crystallized during the process of forming the black matrix 130 and has a high etch rate.

The auxiliary electrode pattern 120 formed of such a conductive material may be used as touch electrode of the self-capacitive touch electrode manner. In the self-capacitive touch electrode manner, the capacitance of a sensing electrode (i.e., the auxiliary electrode pattern in the present disclosure) itself is set to an initial value, and change in the capacitance of the sensing electrode when a touch event using a touch input unit occurs is recognized. In this case, the light emitting display device according to the present disclosure may further include a signal drive unit in the non-active area NA of the first substrate 100, and may connect the auxiliary electrode pattern 120 to the signal drive unit to be used in the self-capacitive touch electrode manner.

An overcoat layer 80 may be provided on the first substrate 100 having the color conversion units 110, the auxiliary electrode pattern 120 and the black matrix 130. The overcoat layer 80 may planarize steps formed by the elements provided on the first substrate 100, and may protect the elements on the first substrate 100. For example, the overcoat layer 80 may be an organic insulating film formed of one of photo acryl, polyimide, a benzocyclobutene resin, and an acrylate, and may be formed as a plurality of layers in some cases.

The second substrate 10 opposite to the first substrate 100 may include thin film transistors TFT formed on the second substrate 10, the light emitting devices 60 connected to the thin film transistors TFT and configured to emit light, and a bank 70 configured to divide the emission areas EA of the light emitting devices 60.

Each of the first substrate 100 and the second substrate 10 may be divided into the active area AA in which an image is displayed, and the non-active area NA in which no image is displayed. The active area AA may include a plurality subpixels including emission areas EA and non-emission areas NEA.

The active area AA of the second substrate 10 may include a plurality of emission areas EA which emits light, and non-emission areas NEA around the emission areas EA. The plurality of emission areas EA may be provided to correspond to the plurality of color conversion units 110 on the first substrate 100, respectively. For example, the plurality of emission areas EA may be arranged in a matrix on the second substrate 10. However, the present disclosure is not limited thereto, and the arrangement structure of the plurality of emission areas EA and the shapes of the respective emission areas EA may be variously modified if needed. The non-emission areas NEA may be provided to overlap with the black matrix 130 on the first substrate 100.

Here, the second substrate 10 may be a glass substrate, or when the second substrate 10 is a plastic substrate, the second substrate 10 may include polyimide or polyamide. Further, various signal lines, such as data lines and gate lines, circuit elements including transistors, such as switching thin film transistors and driving thin film transistors, and capacitors may be formed in the respective subpixels on the second substrate 10. In the present disclosure, one thin film transistor which drives one subpixel is illustrated for convenience of explanation.

The thin film transistor TFT may include an active layer 27, a gate electrode 33 configured to overlap with a channel region 25 of the active layer 27 by interposing a gate insulating film 31 therebetween, and a source electrode 41 and a drain electrode 43 connected to both sides of the active layer 27.

The active layer 27 of the thin film transistor TFT has a source region 21 and a drain region 23 formed at both sides of thereof across the channel region 25. The source region 21 and the drain region 23 are formed of a semiconductor material doped with an n-type or p-type dopant. The channel region 25 overlapping with the gate electrode 33 may be formed of a semiconductor material not doped with an n-type or p-type dopant.

The gate electrode 33 is provided to have the same width as the channel region 25 of the active layer 27 to overlap with the channel region 25 with the gate insulating film 31 interposed therebetween. The gate insulating film 31 is formed in the same pattern as the gate electrode 33 to overlap the channel region 25 of the active layer 27. For example, the gate electrode 33 may be formed as a single layer or multiple layers including one of molybdenum (Mo), aluminum (Al), chrome (Cr), gold (Au), titanium (Ti), nickel (Ni), neodymium (Nd), copper (Cu), and alloys thereof. The gate insulating film 31 may be formed of an inorganic insulating material, and may be, for example, one of a silicon oxide ($SiO_x$) film, a silicon nitride ($SiN_x$) film, a silicon oxynitride ($SiO_xN_y$) film, and a multilayer film thereof.

A light shielding layer 11 on the second substrate 10 overlaps with at least the channel region 25 of the active layer 27 of the thin film transistor TFT, and is disposed below the active layer 27. The light shielding layer 11 prevents external light from passing through the second substrate 10 and being transmitted to the thin film transistor TFT. For example, the light shielding layer 11 may be formed as a single layer including a metal material, i.e., one of molybdenum (Mo), titanium (Ti), aluminum-neodymium (AlNd), aluminum (Al), chrome (Cr), and alloys thereof, or may be formed in a multilayer structure using the same.

A buffer layer 20 is provided on the light shielding layer 11 to cover the light shielding layer 11. For example, the buffer layer 20 may be formed in a single-layer structure or a multilayer structure using at least one of a silicon oxide ($SiO_x$) or a silicon nitride ($SiN_x$).

An interlayer insulating film 30 on the buffer layer 20 may include a source contact hole and a drain contact hole configured to expose the source region 21 and the drain region 23 of the active layer 27, and may cover the gate insulating film 31 and the gate electrode 33. For example, the interlayer insulating film 30 may be formed of an inorganic insulating material. For example, the interlayer insulating film 30 may be formed in a single-layer structure or a multilayer structure using at least one of a silicon oxide ($SiO_x$) film, a silicon nitride ($SiN_x$) film, and a silicon oxynitride ($SiO_xN_y$) film.

The source electrode 41 and the drain electrode 43 on the interlayer insulating film 30 may be provided as the same layer. The source electrode 41 and the drain electrode 43 are connected to the source region 21 and the drain region 23 of the active layer 27 through the source contact hole and the drain contact hole. For example, the source electrode 41 and the drain electrode 43 may be formed as a single layer including a metal material, i.e., one of molybdenum (Mo), aluminum (Al), chrome (Cr), gold (Au), titanium (Ti), nickel (Ni), neodymium (Nd), copper (Cu), and alloys thereof, or may be formed in a multilayer structure using the same.

A passivation layer 40 may be provided on the interlayer insulating film 30 to cover the thin film transistor TFT. Therefore, the thin film transistor TFT may be protected by the passivation layer 40. For example, the passivation layer 40 may be a kind of inorganic insulating film, and may be formed in a single-layer structure or a multilayer structure using one of a silicon oxide ($SiO_x$) film, a silicon nitride ($SiN_x$) film, and a silicon oxynitride ($SiO_xN_y$) film.

A planarization layer 50 may be provided on the passivation layer 40. The planarization layer 50 may be provided to a thickness sufficient to planarize surface steps on the thin film transistor TFT, and may be formed of an organic insulating film. In some cases, when the planarization layer 50 also performs a function of protecting the thin film transistor TFT, the passivation layer 40 may be omitted. For example, the planarization layer 50 may be a kind of organic insulating film, may be one of photo acryl, polyimide, a benzocyclobutene resin, and an acrylate, and may be formed as a plurality of layers in some cases.

The light emitting device 60 on the planarization layer 50 may be formed in a stack structure including a first electrode 61, a light emitting unit 63, and a second electrode 65. When current supplied from a source voltage line flows to the second electrode 65 of the light emitting device 60, and high-voltage current of the thin film transistor is supplied to the first electrode 61 depending on an electrical signal of the gate electrode 33, an electrical field is formed between the first electrode 61 and the second electrode 65, and the light emitting unit 63 emits light. The light emitting device 60 of the light emitting display device according to the present disclosure may be an upper emission type which emits light towards the first substrate 100 opposite to the second substrate 10.

The first electrode 61 of the light emitting device 60 may be provided in each of the plurality of subpixels, and may be connected to the drain electrode 43 of the thin film transistor TFT through the contact hole. The first electrode 61 of each of the plurality of subpixels may include the emission area EA which emits light. For example, the first electrode 61 may be formed in a multilayer structure having at least one transparent conductive film and at least one opaque conductive film having high reflection efficiency. The transparent conductive film of the first electrode 61 may be formed of a material having a relatively high work function, such as indium tin oxide (ITO) or indium zinc oxide (IZO), and the opaque conductive film may be formed as a single layer including one of silver (Ag), aluminum (Al), copper (Cu), molybdenum (Mo), titanium (Ti), nickel (Ni), chrome (Cr), tungsten (W), and alloys thereof, or may be formed in a multilayer structure using the same. Further, the first electrode 61 may be formed in a structure in which a transparent conductive film, an opaque conductive film and a transparent conductive film are sequentially stacked, or in a structure in which a transparent conductive film and an opaque conductive film are sequentially stacked.

The bank 70 may be provided on the first electrode 61 to surround the border of the emission area EA and cover a part of the edge of the first electrode 61. For example, the bank 70 may be an organic insulating film including one of photo acryl, polyimide, a benzocyclobutene resin, and an acrylate, or may be an inorganic insulating film formed in a single layer including one of a silicon oxide ($SiO_x$) film, a silicon nitride ($SiN_x$) film, and silicon oxynitride ($SiO_xN_y$), or a multiple layers using the same.

The light emitting unit 63 on the first electrode 61 may be provided as a common layer which covers the entirety of the first electrodes 61 of the light emitting devices 60 and the upper surface of the bank 70. When the light emitting unit 63 is formed as a single stack, the light emitting unit 63 may include a hole injection layer HIL, a hole transport layer HTL, an emission layer EML, an electron transport layer ETL and an electron injection layer EIL. Here, the light emitting unit 63 may include the emission layer EML configured to emit light of a different color depending on each subpixel, between the hole transport layer HTL and the electron transport layer ETL. The emission layer EML in each subpixel may emit white light, or may emit light of the same color as a color (red, green or blue) corresponding to the color conversion unit 110 provided on the first substrate 100. Otherwise, the light emitting unit 63 may be formed as a multi-stack structure including two or more stacks which are stacked with a charge generation layer CGL interposed therebetween. The charge generation layer CGL has a dual-layer structure including an n-type layer and a p-type layer.

The second electrode 65 may be provided on the light emitting unit 63. Concretely, the second electrode 65 may be provided on the entire surface of the active area AA, and may be provided to a part of the non-active area NA to be connected to the line which supplies source voltage. For example, the second electrode 65 may be formed of a transparent conductive material, such as indium tin oxide (ITO) and indium zinc oxide (IZO), or may include one of silver (Ag), aluminum (Al), magnesium (Mg), and calcium (Ca), or alloys thereof to have a thickness thin enough to transmit light.

An encapsulation layer 90 may be disposed on the second electrodes 65 to protect the light emitting devices 60. The encapsulation layer 90 completely covers the second electrode 65, and may thus prevent external moisture or oxygen from being introduced into the light emitting devices 60. The encapsulation layer 90 may be formed in a structure in which at least one inorganic encapsulation layer and at least one organic encapsulation layer are stacked. Further, the encapsulation layer 90 may planarize the second substrate 10 having surface steps caused by the light emitting devices 60 or foreign substances presenting on the light emitting devices 60. For example, the inorganic encapsulation layer may include a single-layer structure including one of a silicon oxide ($SiO_x$) film, a silicon nitride ($SiN_x$) film, a silicon oxynitride ($SiO_xN_y$) film, a titanium oxide ($TiO_x$) film, and an aluminum oxide ($AlO_x$) film, or a stack structure thereof, and the organic encapsulation layer may include an organic material, such as silicon oxycarbon ($SiOC_x$), acryl and an epoxy-based resin.

The first substrate 100 and the second substrate 10 may be bonded to each other by an adhesive layer having adhesive properties between the overcoat layer 80 and the encapsulation layer 90 provided as the uppermost layers of the first substrate 100 and the second substrate 10 under the state in which the first substrate 100 and the second substrate 10 face each other. Otherwise, the first substrate 100 and the second substrate 10 may be bonded to each other through a sealant provided along the edges thereof under the state in which the first substrate 100 and the second substrate 10 face each other. Thereby, the first substrate 100 and the second substrate 10 may be integrated into the light emitting display device according to the present disclosure.

Hereinafter, a method of manufacturing the first substrate 100 according to the first aspect will be described with reference to FIGS. 5A to 5E.

Figure 5A:
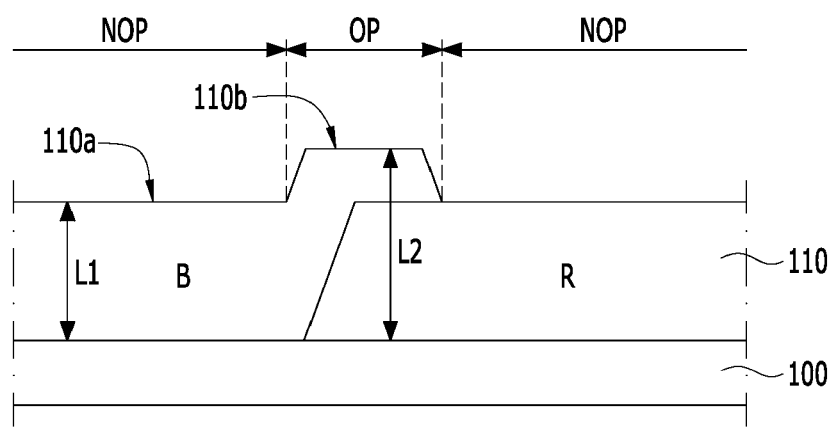
FIGS. 5A to 5E are enlarged cross-sectional views illustrating a method of manufacturing a first substrate according to the first aspect of the present disclosure.

Referring to FIG. 5A, a plurality of color conversion units 110 including different color pigments may be formed on the first substrate 100 through respective mask processes. Here, the different color pigments may include red (R), green (G) and blue (B) pigments. Here, the color conversion units 110 may be patterned such that the edges of the respective color conversion units 110 overlap with each other, and each color conversion unit 110 has an overlapping area OP which overlaps with adjacent color conversion units 110, and a non-overlapping area NOP provided independently on the first substrate 100. Therefore, the surfaces of the overlapping areas OP of the adjacent color conversion units 110 may protrude more than the surfaces of the non-overlapping areas NOP.

Figure 5B:
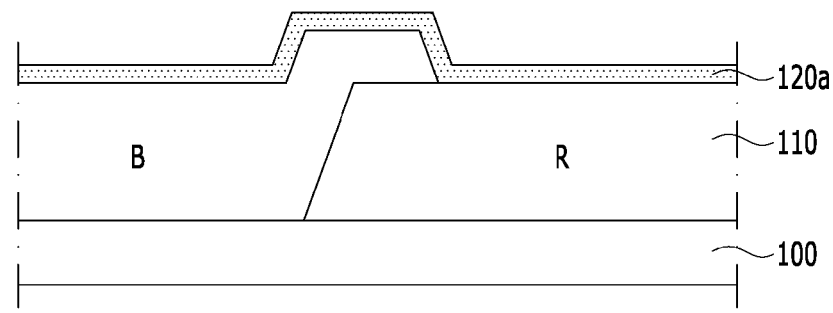

Thereinafter, referring to FIG. 5B, the auxiliary electrode material 120a may be deposited on the entire surface of the first substrate 100 having the plurality of color conversion units 110 formed thereon. Here, the auxiliary electrode material 120a may be formed of indium zinc oxide (IZO). The auxiliary electrode material 120a may not be crystallized during curing in the subsequent process of forming the black matrix 130, may be transparent or have low reflectance, and may have an etch rate which is at least higher than the black matrix 130.

Figure 5C:
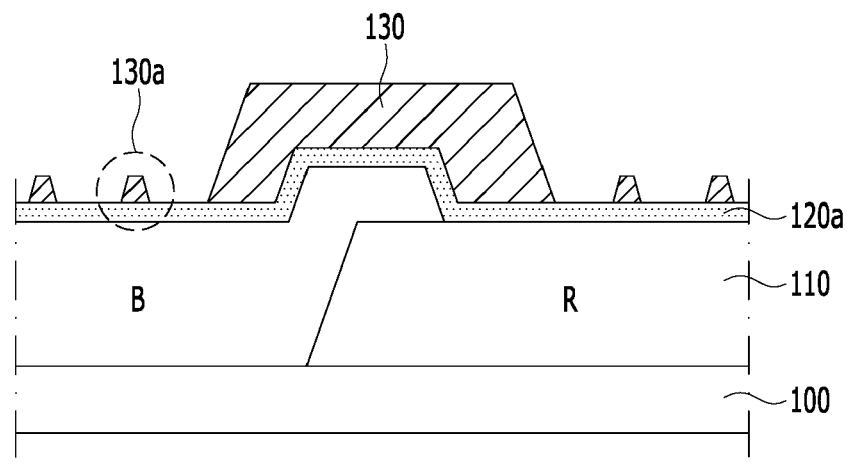

Thereinafter, referring to FIG. 5C, the black matrix 130 may be formed on the auxiliary electrode material 120a through a mask process. Here, in case of the black matrix 130 may be formed of an organic material, a small amount of residues of the black matrix 130 may remain on the auxiliary electrode material 120a after etching.

Figure 5D:
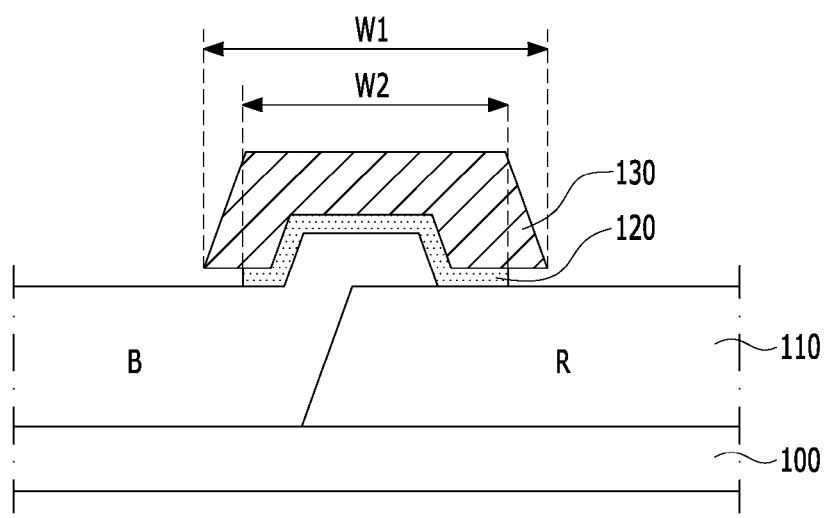

Thereinafter, referring to FIG. 5D, the auxiliary electrode material 120a may be etched using the black matrix 130 as a mask. The auxiliary electrode material 120a may be etched to a part thereof located inside the black matrix 130 because the etch rate of the auxiliary electrode material 120a is higher than the etch rate of the black matrix 130. Therefore, the auxiliary electrode pattern 120 having a second width W2 narrower than a first width W1 of the black matrix 130 may be formed, as shown in FIG. 5D. Further, when the auxiliary electrode pattern 120 is formed, the residues 130a of the black matrix 130 may be removed together with the auxiliary electrode material 120a on the non-overlapping areas NOP of the color conversion units 110.

Figure 5E:
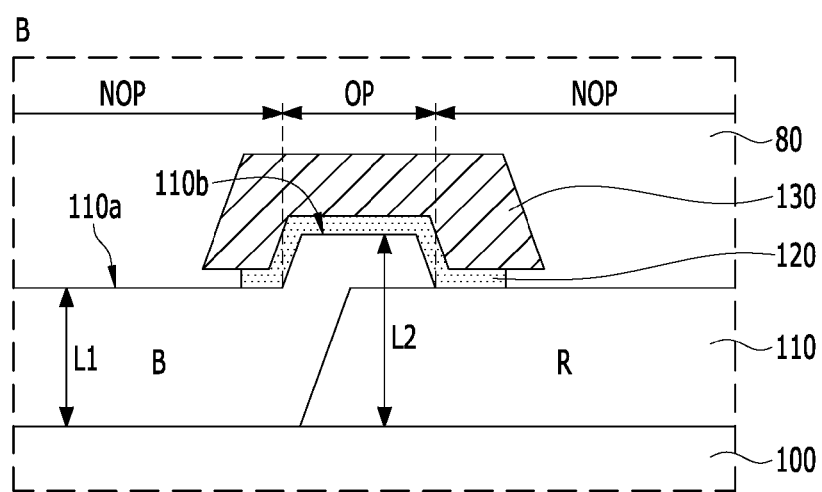

Thereinafter, referring to FIG. 5E, the overcoat layer 80 may be formed on the entire surface of the first substrate 100 having the color conversion units 110, the auxiliary electrode pattern 120 and the black matrix 130 formed thereon. Hereby, one light emitting display device may be manufactured by bonding the manufactured first substrate 100 to the second substrate 10.

Figure 6:
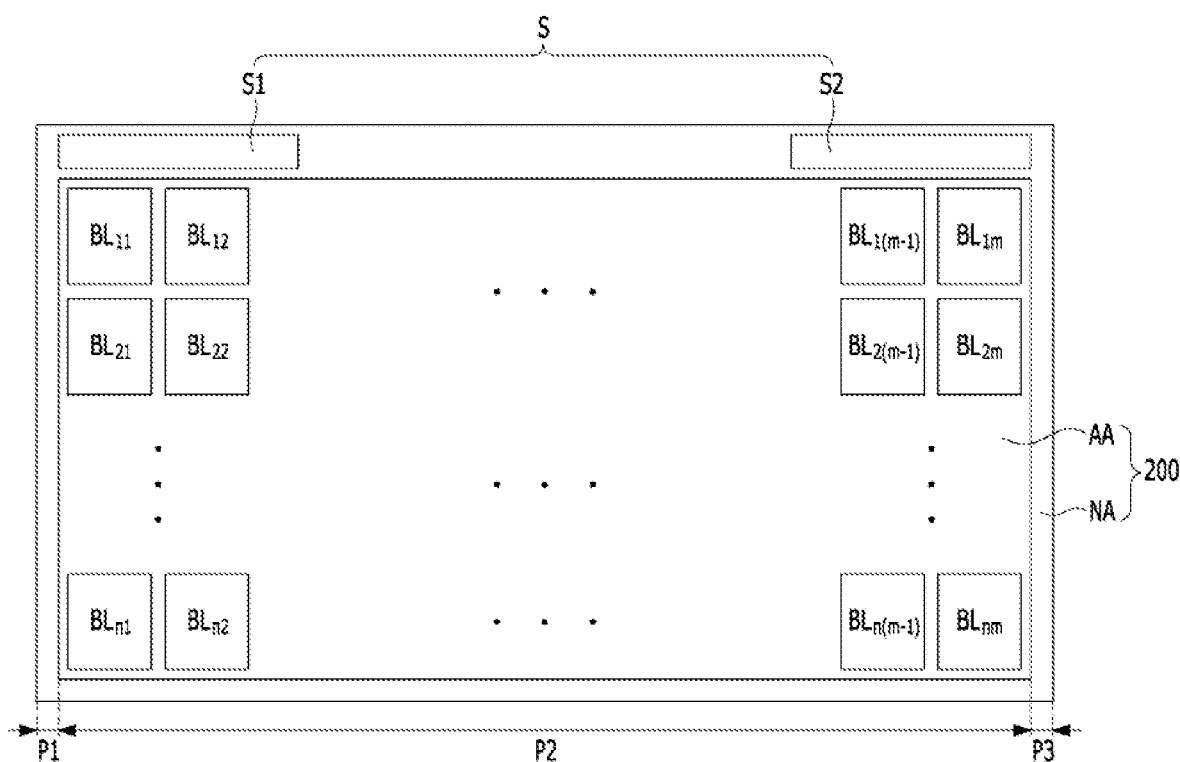
FIG. 6 is a plan view of a light emitting display device according to a second aspect and a third aspect of the present disclosure.
Figure 7A:
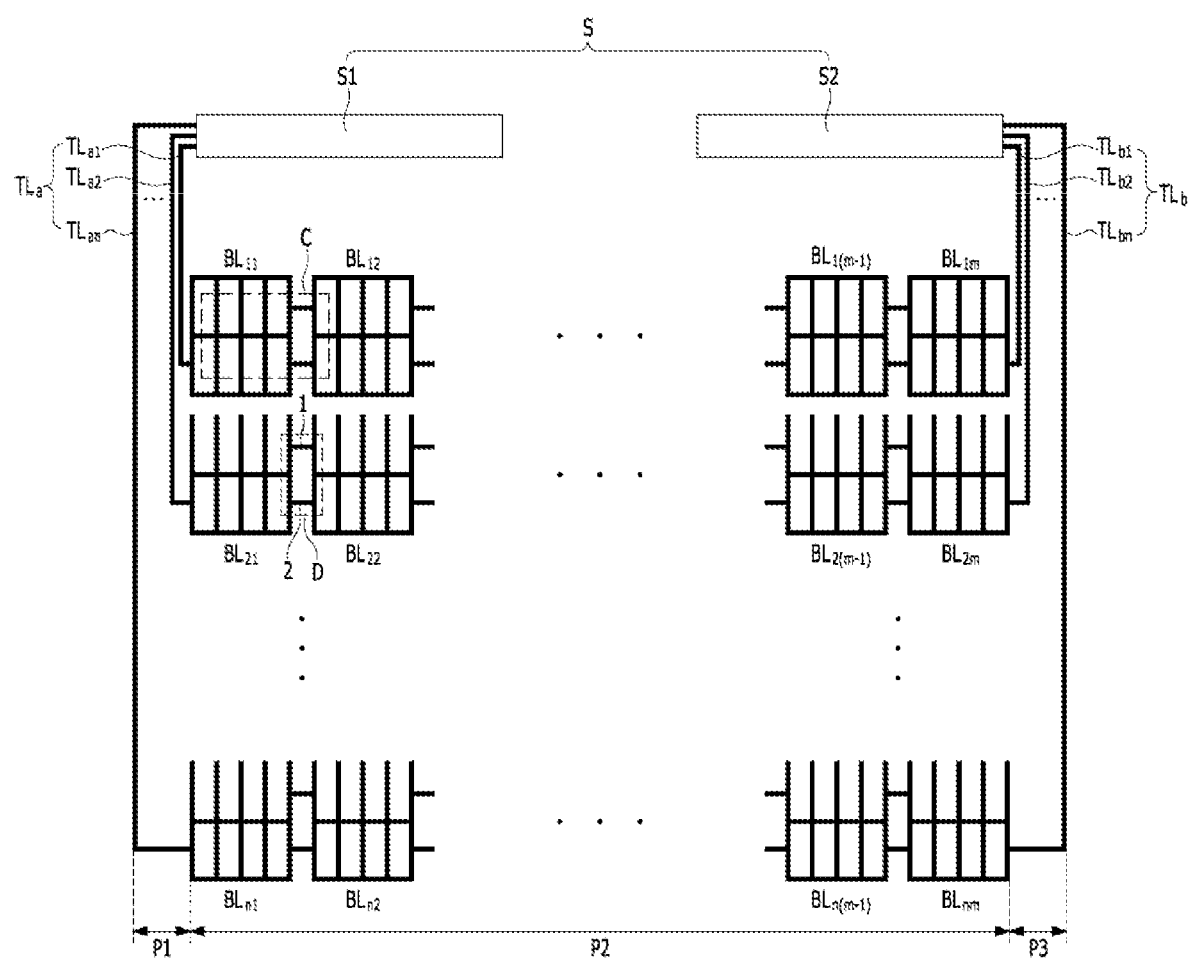
FIGS. 7A to 7C are schematic circuit diagrams illustrating first and second touch electrodes according to the second or third aspect.
Figure 7B:
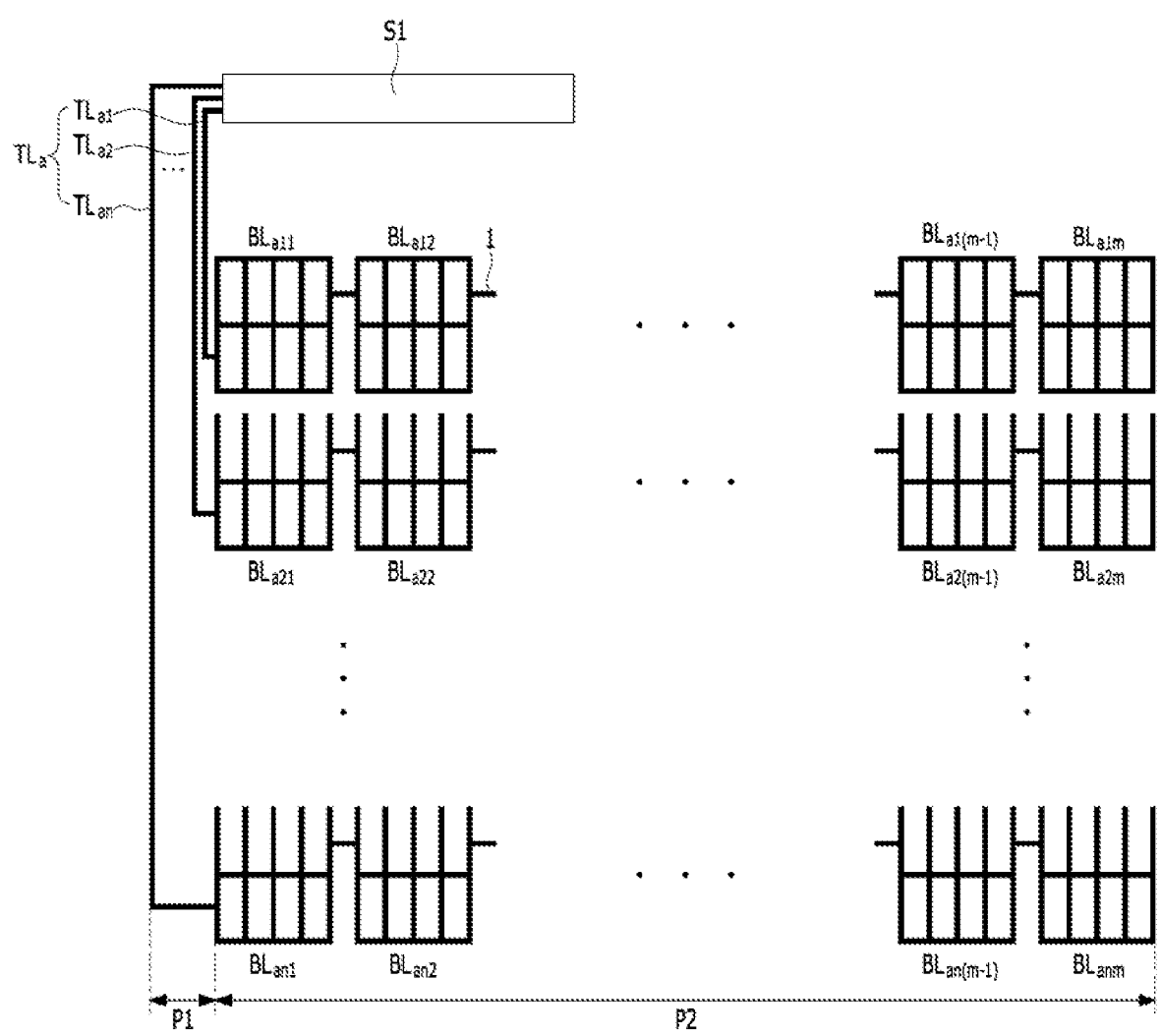
Figure 7C:
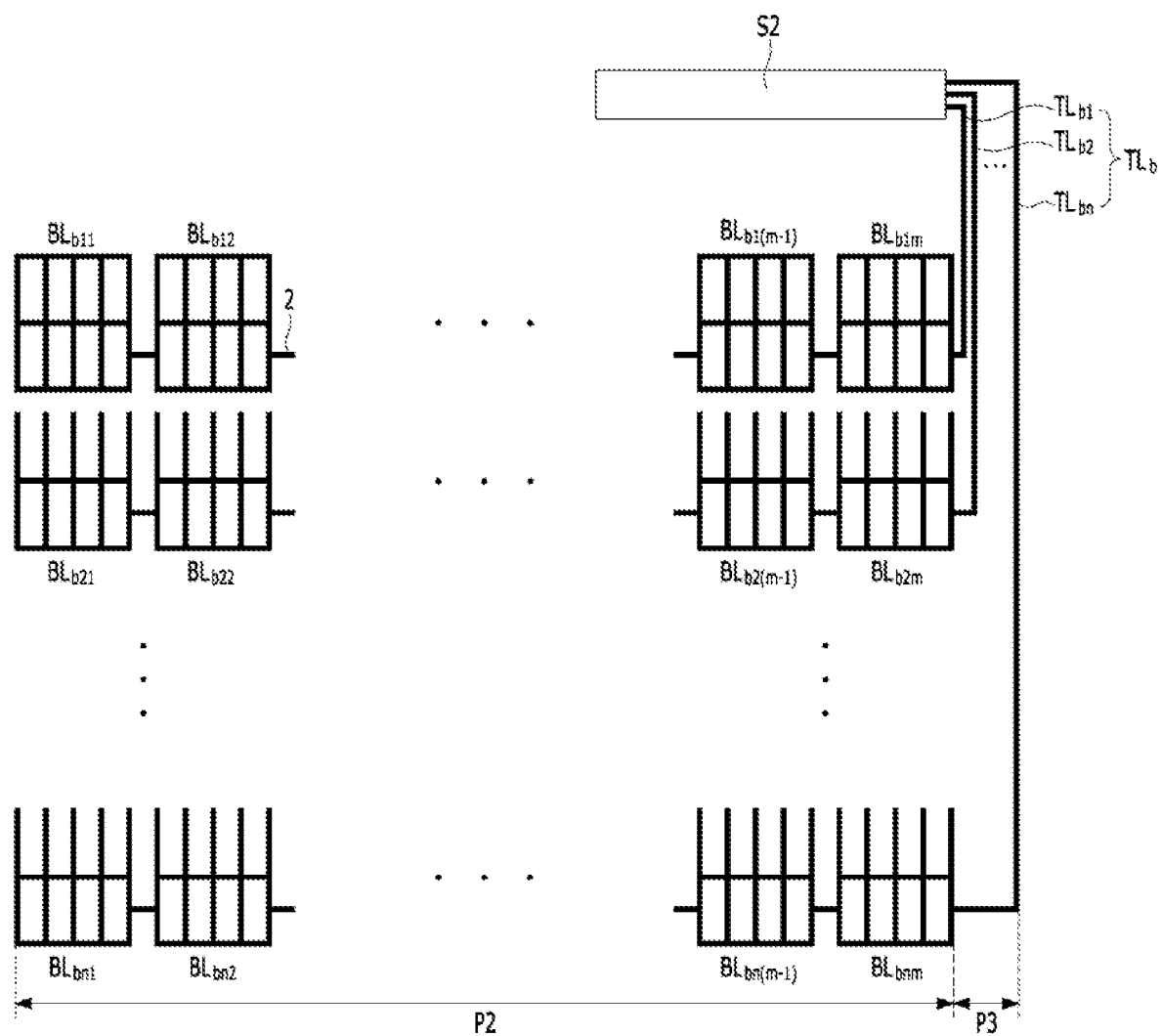

FIG. 6 is a plan view of a light emitting display device according to a second or third aspect of the present disclosure, and FIGS. 7A to 7C are schematic circuit diagrams illustrating first and second touch electrodes according to the second and third aspects.

Referring to FIG. 6, in the light emitting display device according to the second or third aspect of the present disclosure, a first substrate 200 may include an active area AA in which an image is displayed, and a non-active area NA configured to surround the active area AA.

As shown in a second area P2 of FIG. 6 and FIGS. 7A to 7C, a plurality of touch units $BL_{nm}$ may be arranged in a matrix including n rows and m columns in the active area AA. As the plurality of touch units $BL_{nm}$, first touch units $BL_{nm}$ and second touch units $BL_{bnm}$ may be provided to overlap with each other with an insulating layer interposed therebetween (m and n being natural numbers greater than 0). Here, the insulating layer may be a black matrix 230 (shown in FIG. 8) in the second aspect, or may be color conversion units 310 in the third aspect. Further, although the present disclosure illustrates that the plurality of touch units $BL_{nm}$ is formed in a rectangular shape as shown in the drawings, the plurality of touch units $BL_{nm}$ may be formed in other shapes suitable for determination of a contact position, a touch position, and the like.

Specifically, the plurality of touch units $BL_{nm}$ may be provided such that, when a plurality of touch electrodes continuously formed in the column direction is provided in the row direction, discontinuous sections are formed in the row direction on the respective touch electrodes formed in the column direction, to form the respective touch units BL m. For example, a plurality of touch units $BL_{11}$, $BL_{21}$, ..., $BL_{n1}$ arranged in the first column may be formed by dividing a touch electrode, continuously formed in the column direction, in the row direction. The n×m touch units $BL_{nm}$ divided each other may be conductively connected through connection electrodes 1 and 2 in the row direction, as shown in region D of FIG. 7A.

Referring to FIG. 7B, a plurality of first touch units $BL_{anm}$ from first touch electrodes 221 (shown in FIG. 9) may be connected through the first connection electrodes 1 between the first touch units $BL_{anm}$ provided in the respective rows. For example, the first touch unit $BL_{a11}$ located in row 1 and column 1, the first touch unit $BL_{a12}$ located in row 1 and column 2, the first touch unit $BL_{a13}$ located in row 1 and column 3, ..., and the first touch unit $BL_{a1m}$ located in row 1 and column m may be connected to one another through the first connection electrodes 1 provided therebetween.

Referring to FIG. 7C, a plurality of second touch units $BL_{bnm}$ from second touch electrodes 223 (shown in FIG. 9) may be connected through the second connection electrodes 2 between the second touch units $BL_{bnm}$ provided in the respective rows. For example, the second touch unit $BL_{b11}$ located in row 1 and column 1, the second touch unit $BL_{b12}$ located in row 1 and column 2, the second touch unit $BL_{b13}$ located in row 1 and column 3, ..., and the second touch unit $BL_{b1m}$ located in row 1 and column m may be connected to one another through the second connection electrodes 2 provided therebetween.

Here, the first connection electrodes 1 and the second connection electrodes 2 are provided between the plurality of touch units $BL_{nm}$ overlapping with the black matrix 230 (shown in FIG. 8), and may thus not overlap the black matrix 230. Further, the first connection electrodes 1 and the second connection electrodes 2 according to one aspect may be provided in the same layer to be spaced apart from each other, and this will be described in detail below with reference to FIG. 8 to 11 according to the second aspect. According to the third aspect, when the plurality of touch units BL m overlap each other with the color conversion units 310 (shown in FIG. 12) interposed therebetween, the first connection electrodes 1 and the second connection electrodes 2 may be provided in different layers to overlap each other.

The inside of each of the plurality of touch units $BL_{nm}$ may be formed in a mesh type. A mesh-type opening part of each of the plurality of touch units $BL_{nm}$ may overlap the color conversion units 210 (shown in FIG. 8) corresponding to the emission areas EA. Meanwhile, the color conversion units 210 having the same color may be provided in the mesh-type opening part provided to the column direction. In addition, the color conversion units 210 having different colors may be provided in the row direction.

Referring to first and third areas P1 and P3 shown in FIG. 6 and FIGS. 7A to 7C, the first touch units $BL_{anm}$ and the second touch units $BL_{bnm}$ may be connected to a first touch electrode driver S1 and a second touch electrode driver S2 through first touch link lines $TL_a$ and second touch link lines $TL_b$ in the non-active area NA, respectively. Here, a touch electrode drive unit S according to the present disclosure is not limited to the first and second touch electrode drivers S1 and S2, and the first touch electrode driver S1 and the second touch electrode driver S2 may be integrated into one touch electrode driver.

Concretely, referring to the first area P1 shown in FIG. 7B, one side end of the respective rows n of the first touch units $BL_{anm}$ is connected to the first touch electrode driver S1 by a corresponding each of the first touch link lines $TL_{a1}$, $TL_{a2}$, ..., $TL_{an}$. Further, referring to the third area P3 shown in FIG. 7C, one side end of the respective rows n of the second touch units $BL_{bnm}$ is connected to the second touch electrode driver S2 by a corresponding each of the second touch link lines $TL_{b1}$, $TL_{b2}$, ..., $TL_{bn}$.

However, the present disclosure is not limited thereto, each of the first touch link lines TL an and the second touch link lines $TL_bn$ may include connection lines extending to the second area P2, and may be connected to each of the first touch units $BL_{anm}$ and the second touch units $BL_{bnm}$ by the connection lines. Further, the first touch link lines $TL_{an}$ and the second touch link lines $TL_bn$ according to the present disclosure may be provided in one of the first area P1 and the third area P3 to be spaced apart from each other. Further, although FIGS. 7A to 7C illustrate that the first touch electrode driver S1 and the second touch electrode driver S2 are disposed coaxially, the present disclosure is not limited thereto, and the first touch electrode driver S1 and the second touch electrode driver S2 may be disposed to have different axes.

The above-described touch electrodes according to the present disclosure will be driven as follows.

First touch electrodes 221 forming the first touch units $BL_am$ may be used as sense electrodes which sense multi-touch, and second touch electrodes 223 forming the second touch units $BL_{bnm}$ may be used as drive electrodes to which drive signals are applied. Meanwhile, the touch electrode drive unit S including the first touch electrode driver S1 and the second touch electrode driver S2 may calculate information about user touch positions using electrical analog signals transmitted from the touch electrodes, and may transmit the calculated position information to the second substrate including the light emitting devices.

Concretely, drive signals from the first touch electrode driver S1 and the second touch electrode driver S2 may be sequentially applied to the first touch units $BL_{anm}$ and the second touch units $BL_{bnm}$. Further, as a touch event on the first substrate 200 occurs, change in mutual capacitance between some of the plurality of first touch units $BL_{anm}$ and corresponding second touch units $BL_{bnm}$ in response to the drive signals may be sensed. The mutual capacitance is generated when drive voltage is applied to the second touch units $BL_{bnm}$, and an electric field may be generated in the entirety of areas in which the respective touch units are formed as well as overlapping areas between the first touch units $BL_{nm}$ and the second touch units $BL_{bnm}$.

That is, when a touch unit capable of causing changes in capacitance comes into contact with the light emitting display device, the electric field between the first touch unit $BL_{anm}$ and the second touch unit $BL_{bnm}$ at a touch point may be changed, and the touch electrode drive unit S may sense change in mutual capacitance.

Here, an insulating layer configured to separate the first touch units $BL_{anm}$ and the second touch units $BL_{bnm}$, which overlap with each other, may be provided. The insulating layer may correspond to the black matrix 230 in the second aspect, and may correspond to the color conversion units 310 in the third aspect. The second aspect and the third aspect will be described in detail below.

Figure 8:
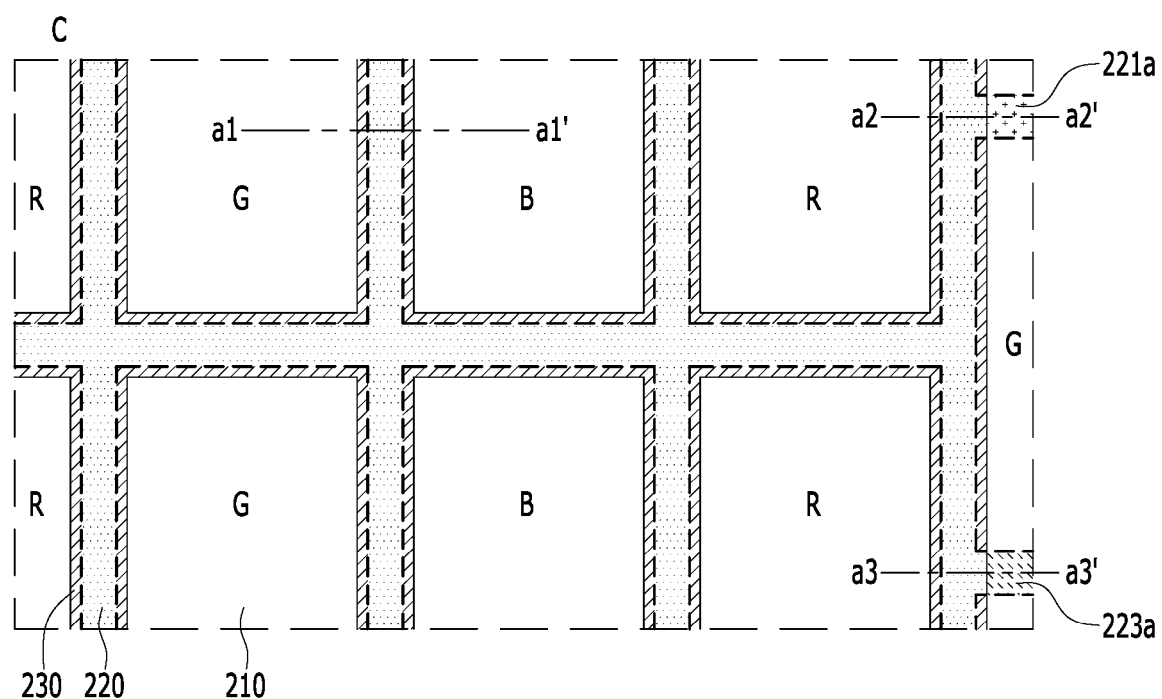
FIG. 8 is an enlarged plan view of region C of FIG. 7A.
Figure 9:
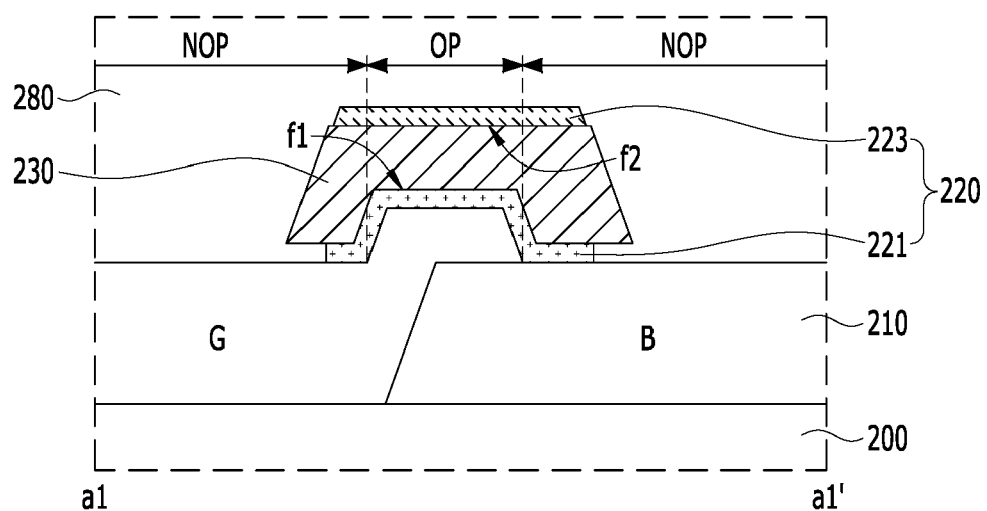
FIG. 9 is a cross-sectional view taken along line a1-a1' of FIG. 8 according to the second aspect.
Figure 10:
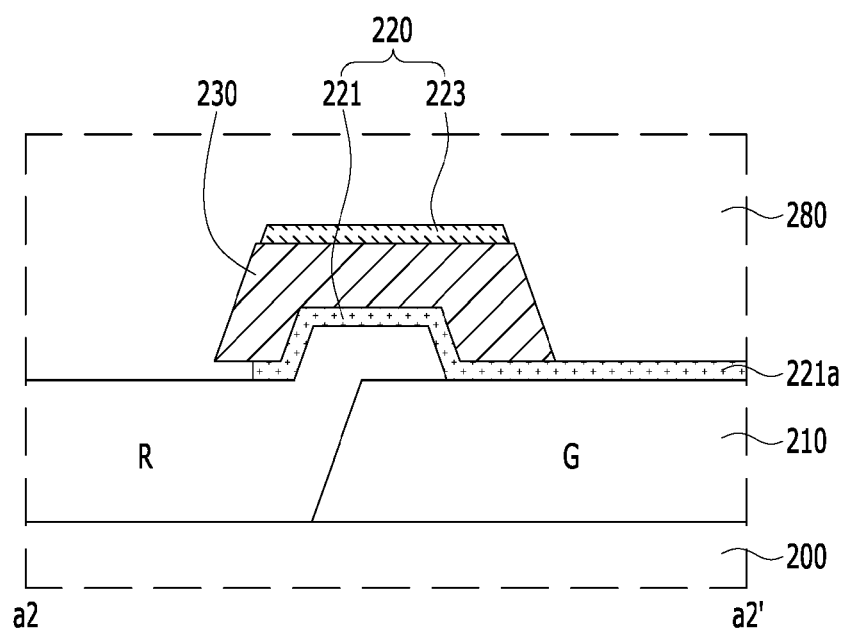
FIG. 10 is a cross-sectional view taken along line a2-a2' of FIG. 8 according to the second aspect.
Figure 11:
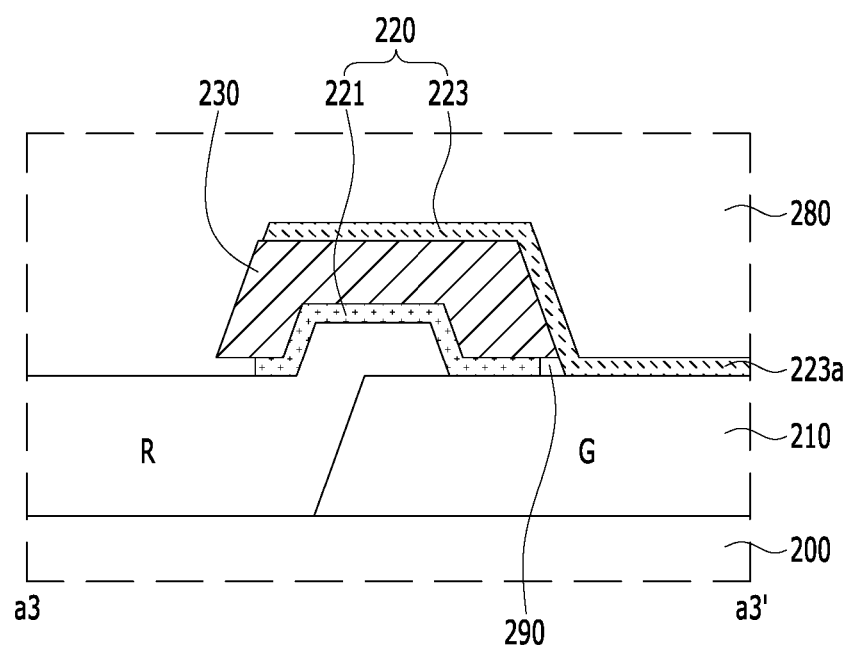
FIG. 11 is a cross-sectional view taken along line a3-a3' of FIG. 8 according to the second aspect.

FIG. 8 is an enlarged plan view of region C of FIG. 7A. Further, FIGS. 9, 10, and 11 are cross-sectional views taken along line a1-a1', line a2-a2', and line a3-a3' of FIG. 8, respectively. A detailed description of elements of the second aspect which are substantially the same as those of the earlier aspect will be omitted.

Collectively referring to FIGS. 8 to 11, the light emitting display device according to the second aspect of the present disclosure may include the first substrate 200, the plurality of color conversion units 210 provided on the first substrate 200 and having overlapping areas OP and non-overlapping areas NOP, the black matrix 230 provided on the overlapping areas OP of the color conversion units 210, the first touch electrodes 221 provided between the black matrix 230 and the color conversion units 210 and provided farther inward than the black matrix 230, and the second touch electrodes 223 configured to overlap with the first touch electrodes 221.

Referring to FIG. 8, the plurality of color conversion units 210 may be provided on the first substrate 200, and each color conversion unit 210 may have the overlapping area OP which overlaps with adjacent color conversion units 210, and the non-overlapping area NOP provided independently on the first substrate 100. The surfaces of the overlapping areas OP of the color conversion units 210 may protrude more than the surfaces of the non-overlapping areas NOP, as the adjacent color conversion units 210 are formed on the first substrate 200.

For example, the color conversion units 210 having the overlapping areas OP and the non-overlapping areas NOP and configured to emit light of different colors, i.e., red (R), green (G) and blue (B), may be alternately arranged in one direction, and the color conversion units 210 having the overlapping areas OP and the non-overlapping areas NOP and configured to emit light of the same color may be arranged in a direction perpendicular to the above direction. However, the arrangement structure of the plurality of color conversion units 210 according to the present disclosure is not limited thereto, and the color conversion units 210 configured to emit light of different colors, i.e., red (R), green (G) and blue (B), may be arranged in other structures to have different sizes.

Referring to FIG. 9 which is the cross-sectional view taken along line a1-a1' of FIG. 8, the first touch electrode 221 and the second touch electrode 223 according to the second aspect may come into contact with a first surface f1 and a second surface f2 of the black matrix 230, respectively, and may overlap with each other on the overlapping area OP of the color conversion unit 210 with the black matrix 230 interposed therebetween. Further, touch electrodes 220 including the first touch electrodes 221 and the second touch electrodes 223 may be provided farther inward than the black matrix 230.

An overcoat layer 280 may be provided on the first substrate 200 where the plurality of color conversion units 210, the touch electrodes 220 and the black matrix 230 are formed. The overcoat layer 280 may planarize steps formed by the elements provided on the first substrate 200, and may protect the elements on the first substrate 200.

In the processes of forming the first touch electrodes 221 and the black matrix 230, the black matrix 230 may be formed on the overlapping areas OP after a first touch electrode material has been deposited on the entire surface of the first substrate 200. Here, residues of the black matrix 230 may remain on the first touch electrode material on the non-overlapping areas NOP during the process of forming the black matrix 230. Therefore, in the light emitting display device according to the present disclosure, the residues of the black matrix 230 may be removed by etching the first touch electrode material using the black matrix 230 as a mask, after formation of the black matrix 230. Therefore, the light emitting display device according to the present disclosure may increase light transmittance and color transmittance, because no residues of the black matrix 230 remain on the non-overlapping areas NOP of the color conversion units 210 corresponding to the emission areas EA.

Accordingly, the first touch electrodes 221 may be formed of an indium oxide such as indium zinc oxide (IZO), suitable for removal of the residues of the black matrix 230.

First connection electrodes 221a may be provided between the plurality of first touch units $BL_a$, and second connection electrodes 223a may be provided between the plurality of second touch units $BL_b$. The first connection electrodes 221a and the second electrodes 223a may be provided on the same layer, i.e., the color conversion units 210, and spaced apart from each other.

Concretely, referring to FIG. 10, the first connection electrodes 221a between the first touch electrodes 221 may extend from the first touch electrodes 221 on the overlapping areas OP to be provided on the non-overlapping areas NOP of the color conversion units 210.

Referring to FIG. 11, the second connection electrodes 223a between the second touch electrodes 223 may extend from the second touch electrodes 223 on the black matrix 230 to cover the side surface of the black matrix 230 and be provided on the non-overlapping areas NOP of the color conversion units 210. Here, as shown in FIG. 11, spaces 290 may be formed between the first touch electrodes 221 and the second connection electrodes 223a. That is, in the second aspect, the first touch electrodes 221 are provided farther inward than the black matrix 230, and thereby, the second connection electrodes 223a extending from the second touch electrodes 223 to the surfaces of the non-overlapping areas NOP may not come into contact with the first touch electrodes 221.

Here, the first connection electrodes 221a and the second connection electrodes 223a may be formed as the same transparent electrodes as the first touch electrodes 221 and the second touch electrodes 223. Therefore, even though the first connection electrodes 221a and the second connection electrodes 223a are provided on the non-overlapping areas NOP of the color conversion units 210 corresponding to the emission areas on the second substrate, the first connection electrodes 221a and the second connection electrodes 223a may be invisible in the light emitting display device.

The black matrix 230 is black in color to absorb light, and may thus not be provided on the non-overlapping areas NOP of the color conversion units 210 corresponding to the emission areas on the second substrate. Therefore, the black matrix 230 may not be provided on the color conversion units 210 having the first connection electrodes 221a and the second connection electrodes 223a.

That is, the black matrix 230 according to the second aspect may be provided to overlap with the first touch electrodes 221 and the second touch electrodes 223. Therefore, the black matrix 230 according to the second aspect may be provided on the overlapping areas OP of the color conversion units 210, and may thus be closer to the second substrate. Accordingly, the light emitting display device according to the present disclosure has the black matrix 230 on the color conversion units 210, thereby being capable of improving color viewing angle properties.

compared to the first aspect, the light emitting display device according to the second aspect of the present disclosure has the first touch electrodes 221 on the first surface f1 of the black matrix 230, and is advantageous in that the first touch electrode 221 may be not only used to remove residues of the black matrix 230 but also used as electrodes for touch. Further, the light emitting display device according to the second aspect of the present disclosure has the first touch electrodes 221 and the second touch electrodes 223 formed on a panel having the color conversion units 210, and thus does not require a separate touch panel configured to form the first touch electrodes 221 and the second touch electrodes 223 thereon and may thus simplify a manufacturing process, and may remove residues of the black matrix 230 through the first touch electrodes 221.

In addition, the light emitting display device according to the present disclosure has the first touch electrodes 221 and the second touch electrodes 223 formed on the first substrate 200 having the color conversion units 210, thus being capable of having improved touch sensitivity and preventing parasitic capacitance from being generated due to electrodes on the second substrate, compared to formation of touch electrode structures directly on the second substrate having the light emitting devices.

Figure 12:
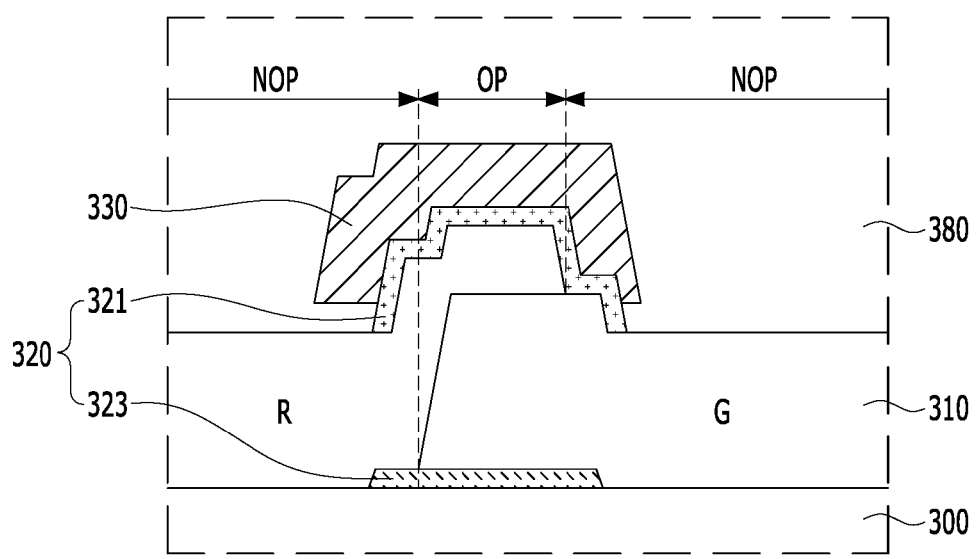
FIG. 12 is a cross-sectional view taken along line a1-a1' of FIG. 8 according to the third aspect.

FIG. 12 is a cross-sectional view taken along line a1-a1' of FIG. 8 according to the third aspect of the present disclosure. A detailed description of elements of the third aspect which are substantially the same as those of the earlier aspect will be omitted.

Referring to FIG. 12, the light emitting display device according to the third aspect of the present disclosure may include a first substrate 300, a plurality of color conversion units 310 provided on the first substrate 300 and having overlapping areas OP and non-overlapping areas NOP, a black matrix 330 provided on the overlapping areas OP of the color conversion units 310, and touch electrodes 320 including a first touch electrode 321 and a second touch electrode 323. The first touch electrode 321 is provided between the black matrix 330 and the color conversion units 310 and provided farther inward than the black matrix 330, and the second touch electrode 323 is configured to overlap with the first touch electrode 321.

An overcoat layer 380 may be provided on the first substrate 300 where the plurality of color conversion units 310, the touch electrodes 320 and the black matrix 330 are formed. The overcoat layer 380 may planarize steps formed by the elements provided on the first substrate 300, and may protect the elements on the first substrate 300.

Referring back to FIG. 12, the plurality of color conversion units 310 may be provided on the first substrate 300, and each color conversion unit 310 may have the overlapping area OP which overlaps with adjacent color conversion units 310, and the non-overlapping area NOP provided independently on the first substrate 300. The surfaces of the overlapping areas OP of the color conversion units 310 may protrude more than the surfaces of the non-overlapping areas NOP thereof, as the adjacent color conversion units 310 are sequentially formed on the first substrate 300.

Further, the second touch electrodes 323 according to the third aspect of the present disclosure are provided on the first substrate 300, and thereby, the overlapping areas OP of the color conversion units 310 may protrude more than in the first and second aspects. Therefore, the black matrix 330 disposed on the overlapping areas OP of the color conversion units 310 may be closer to the second substrate, and may be more effective in improving color viewing angle properties, compared to the first and second aspects.

As is apparent from the above description, a light emitting display device according to the present disclosure has the following effects.

First, the light emitting display device according to the present disclosure has a black matrix on overlapping areas of color conversion units, thereby being capable of reducing a distance between the black matrix and emission areas of light emitting devices and thus improving color viewing angle properties.

Second, the light emitting display device according to the present disclosure has an auxiliary electrode pattern between the color conversion units and the black matrix, thereby being capable of removing residues of the black matrix.

Third, the light emitting display device according to the present disclosure may use the auxiliary electrode pattern as touch electrodes simultaneously with removal of the residues of the black matrix through the auxiliary electrode pattern, thereby being capable of reducing energy production and use of hazardous substances to remove the residues of the black matrix. Therefore, the light emitting display device according to the present disclosure has an environmental, social, and governance (ESG) effect.

The light emitting display device according to one aspect of the present disclosure is described as follows.

The light emitting display device according to one aspect of the present disclosure may include color conversion units on a first substrate, each of the color conversion units having an overlapping area and a non-overlapping area, a black matrix on the overlapping area of each of the color conversion units, and an auxiliary electrode pattern between the black matrix and each of the color conversion units, the auxiliary electrode pattern farther inwards than the black matrix.

In the light emitting display device according to one aspect of the present disclosure, the auxiliary electrode pattern comprises one of an indium oxide of indium zinc oxide (IZO), indium gallium zinc oxide (IGNO), indium tin oxide (ITO), and the like.

In the light emitting display device according to one aspect of the present disclosure, the auxiliary electrode pattern comprises an indium oxide layer and a metal layer in multiple layers.

In the light emitting display device according to one aspect of the present disclosure, the black matrix comprises a black resin.

In the light emitting display device according to one aspect of the present disclosure, a surface of the overlapping area protrudes more than a surface of the non-overlapping area.

In the light emitting display device according to one aspect of the present disclosure, the second substrate includes a bank facing the black matrix and the black matrix overlaps with the bank.

In the light emitting display device according to one aspect of the present disclosure, the non-overlapping area of the color conversion units corresponds to an emission area of the second substrate.

In the light emitting display device according to one aspect of the present disclosure, the auxiliary electrode pattern is connected to a signal drive unit at a non-active area of the first substrate.

It will be apparent to those skilled in the art that various modifications and variations may be made in the present disclosure without departing from the spirit or scope of the disclosure. Thus, it is intended that the present disclosure cover the modifications and variations of the present disclosure provided they come within the scope of the appended claims and their equivalents.

What is claimed is:

1. A light emitting display device comprising:
a plurality of color conversion units disposed on a first substrate, each of the plurality of color conversion units having an overlapping area and a non-overlapping area;
a black matrix disposed on the overlapping area of each of the plurality of color conversion units; and
an auxiliary electrode pattern disposed between the black matrix and each of the plurality of color conversion units and disposed farther inwards than the black matrix.

2. The light emitting display device according to claim 1, wherein the auxiliary electrode pattern includes an indium oxide.

3. The light emitting display device according to claim 2, wherein the auxiliary electrode pattern further includes one of zinc, gallium and tin.

4. The light emitting display device according to claim 1, wherein the auxiliary electrode pattern includes a multiple layer of an indium oxide layer and a metal layer.

5. The light emitting display device according to claim 1, wherein the black matrix includes black resin.

6. The light emitting display device according to claim 1, wherein a surface of the overlapping area protrudes more than a surface area of the non-overlapping area.

7. The light emitting display device according to claim 1, further comprising a second substrate facing the first substrate and including a bank facing and overlapping with the black matrix.

8. The light emitting display device according to claim 7, wherein the non-overlapping area of the color conversion units corresponds to an emission area of the second substrate.

9. The light emitting display device according to claim 1, wherein the auxiliary electrode pattern is connected to a signal drive unit at a non-active area of the first substrate.

10. A light emitting display device comprising:
a first substrate;
a plurality of color conversion units provided on the first substrate, each color conversion unit having an overlapping area and a non-overlapping area;
a black matrix provided in the overlapping area of the plurality of color conversion units;
a first touch electrode provided between the black matrix and the plurality of color conversion units, and provided farther inward than the black matrix; and
a second touch electrode overlapping with the first touch electrode.

11. The light emitting display device according to claim 10, wherein the first touch electrode is in contact with a first surface of the black matrix; and
wherein the second touch electrode is in contact with a second surface of the black matrix, and the second surface is disposed to be opposite to the first surface.

12. The light emitting display device according to claim 10, wherein the first substrate includes a touch electrode drive unit at a non-active area where the color conversion units are not provided; and
wherein the first touch electrode and the second touch electrode are connected to the touch electrode drive unit.

13. The light emitting display device according to claim 12, wherein the first touch electrode and the second touch electrode are respectively connected to the touch electrode drive unit by a first touch link line and a second touch link lines provided at the non-active area.

14. The light emitting display device according to claim 10, wherein the first touch electrode includes a plurality of first touch units and the second touch electrode includes a plurality of second touch units; and
each of the plurality of first touch units and the plurality of second touch units is provided in a mesh shape.

15. The light emitting display device according to claim 14, wherein the first touch electrode further includes first connection electrodes between the plurality of first touch units connected to each other; and
wherein the second touch electrode further includes second connection electrodes between the plurality of second touch units connected to each other.

16. The light emitting display device according to claim 15, wherein the first connection electrodes and the second connection electrodes are spaced apart from each other in the non-overlapping areas of the plurality of color conversion units.

17. The light emitting display device according to claim 10, wherein the second touch electrode is provided between the first substrate and the color conversion units.

18. A light emitting display device comprising:
first and second color conversion units disposed on a first substrate and each color conversion unit including an overlapping area and a non-overlapping area;
a first electrode disposed on the overlapping area of the first color conversion unit and the non-overlapping areas of each color conversion unit;
a black matrix disposed on the first electrode,
wherein the black matrix has an edge extends more than an edge of the first electrode toward the non-overlapping area of at least one of the first and second color conversion units.

19. The light emitting display device according to claim 18, further comprising a second electrode overlapping with the first electrode.

20. The light emitting display device according to claim 19, wherein the second electrode is disposed on the black matrix.

21. The light emitting display device according to claim 20, wherein the second electrode extends to dispose on the non-overlapping area of the second color conversion unit.

22. The light emitting display device according to claim 20, wherein the first electrode extends to dispose on the non-overlapping area of the second color conversion unit.

23. The light emitting display device according to claim 19, wherein the second electrode is disposed on the first substrate.

* * * * *